United States Patent
Holcombe et al.

(10) Patent No.: US 6,284,214 B1
(45) Date of Patent: Sep. 4, 2001

(54) LOW OR NO SLAG MOLTEN METAL PROCESSING OF COKE CONTAINING VANADIUM AND SULFUR

(75) Inventors: Thomas C. Holcombe, Neshanic Station, NJ (US); Donald P. Malone, Grayson, KY (US)

(73) Assignees: Marathon Ashland Petroleum LLC, Findlay; Envires LLC, Miamisburg, both of OH (US)

( * ) Notice: Subject to any disclaimer, the term of this patent is extended or adjusted under 35 U.S.C. 154(b) by 0 days.

(21) Appl. No.: 09/324,317

(22) Filed: Jun. 2, 1999

Related U.S. Application Data

(60) Provisional application No. 60/088,564, filed on Jun. 9, 1998.

(51) Int. Cl.$^7$ .................................................. C01B 17/20
(52) U.S. Cl. ....................... 423/563; 423/415.1; 423/565; 423/592; 75/622
(58) Field of Search ................... 201/17, 36; 44/591, 44/607; 75/362, 363, 622; 423/565, 563, 62, 415.1, 592

(56) References Cited

U.S. PATENT DOCUMENTS

| | | | |
|---|---|---|---|
| 1,638,057 | * 8/1927 | Oberle | 423/592 |
| 3,526,478 | * 9/1970 | Pelczarski et al. | 23/212 |
| 3,533,739 | * 10/1970 | Pelczarski et al. | 23/134 |
| 3,835,033 | * 9/1974 | Dugan et al. | 208/125 |
| 3,919,118 | * 11/1975 | Robinson et al. | 423/461 |
| 4,071,355 | 1/1978 | Staggers | 75/30 |
| 4,087,514 | * 5/1978 | Robinson et al. | 423/461 |
| 4,203,759 | 5/1980 | Metrailer et al. | 75/363 |
| 4,243,639 | 1/1981 | Haas et al. | 423/63 |
| 4,345,990 | 8/1982 | Fahlstrom et al. | 208/11 R |
| 4,443,415 | 4/1984 | Queneau et al. | 423/68 |
| 4,708,819 | 11/1987 | Vasconcellos et al. | 252/373 |
| 4,816,236 | 3/1989 | Gardner | 423/65 |
| 5,259,864 | 11/1993 | Greenwalt | 75/445 |
| 5,277,795 | 1/1994 | Thornhill et al. | 208/251 R |
| 5,324,341 | 6/1994 | Nagel et al. | 75/503 |
| 5,427,603 | 6/1995 | Samant et al. | 75/622 |
| 5,484,554 | 1/1996 | Vuong et al. | 252/373 |
| 5,772,726 | * 6/1998 | Woods et al. | 75/10.22 |

* cited by examiner

Primary Examiner—Steven P. Griffin
Assistant Examiner—Timothy C Vanoy
(74) Attorney, Agent, or Firm—Richard D. Stone; Laurence P. Hobbes

(57) ABSTRACT

A process for recovering and purifying vanadium found in petroleum coke is disclosed. Coke containing V and sulfur is charged to a molten metal bath and dissolved to form a molten metal bath with dissolved carbon, dissolved V metal and dissolved sulfur. At least a majority of the dissolved sulfur is released as $H_2S$ by maintaining reducing conditions in the bed, by maintaining a high concentration of dissolved carbon or addition of steam or hydrogen rich hydrocarbon such as methane or some combination of these approaches.

11 Claims, 1 Drawing Sheet

LOW OR NO SLAG MOLTEN METAL PROCESSING OF COKE CONTAINING VANADIUM AND SULFUR

CROSS REFERENCE TO RELATED APPLICATIONS

This application claims the benefit of prior provisional application Low or no Slag Molten Metal Processing of Coke Containing Vanadium and Sulfur, filed Jun. 9, 1998, Serial No. 60/088,564.

Many refiners are now forced to process more difficult stocks, which are heavier and more metals contaminated. Many heavy crudes contain significant amounts of vanadium and sulfur and frequently with lesser amounts of Ni, Fe and other metal compounds.

Such heavy crudes are difficult to process catalytically, so an initial stage of thermal processing, usually some form of coking, is typically used to free distillable, relatively metals free products from vanadium containing coke. The coker gas oil and coker naphtha are essentially free of metals and may be processed by conventional catalytic upgrading processes to produce high quality transportation fuels and other hydrocarbon products. Unfortunately, coking of these difficult crudes produces large amount of coke, a solid product with an enhanced concentration of vanadium and sulfur and other metals present in the charge to the coker.

Many cokers produce coke which is so contaminated with metals and sulfur that it has little value as fuel. The sulfur generally precludes use of coke in cement kilns. Such materials usually have enough vanadium to cause processing problems but too low a vanadium concentration to make vanadium recovery economically attractive.

Some coking processes, such as fluid bed cokers, especially those employing gasifiers, can produce large amounts of fine, low density coke particles which is especially difficult to treat using conventional technology.

To illustrate just how difficult it is to process vanadium rich cokes, some representative prior art processes are reviewed below.

U.S. Pat. No. 4,203,759, Metrailer et al, PROCESS FOR THE PREPARATION OF A VANADIUM-CONTAINING METALLIC ASH CONCENTRATE, taught heating partially gasified coke with oxygen containing gas to produce low density ash. Most ash particles produced had a diameter of less than 1 micron. The fine ash was readily processed with sulfuric acid to recover vanadium.

U.S. Pat. No. 4,243,639, Haas et al, METHOD FOR RECOVERING VANADIUM FROM PETROLEUM COKE, taught gasifying the coke with steam in the presence of an alkali metal salt to improve V recovery during subsequent processing steps.

U.S. Pat. No. 4,345,990, Fahlstrom et al, METHOD FOR RECOVERING OIL AND/OR GAS FROM CARBONACEOUS MATERIALS, taught use of two molten baths to process a variety of carbon containing wastes. A lead or zinc first bath operated at 500C. to thermally devolatilize the carbonaceous material, while the second bath of molten iron operated at 1200 C. and operated with oxygen to gasify residual quantities of carbon.

U.S. Pat. No. 4,443,415, Queneau et al, RECOVERY OF V205 AND NICKEL VALUES FROM PETROLEUM COKE, taught slurrying coke in an aqueous solution of sodium carbonate to increase V recovery.

U.S. Pat. No. 4,708,819, Vasconcellos et al, REDUCTION OF VANADIUM IN RECYCLE PETROLEUM COKE, taught the problems of high vanadium levels during partial oxidation (the vanadium forms eutectics with refractory walls, melting them). The vanadium content of recycled, unconverted coke was reduced by froth flotation treatment.

U.S. Pat. No. 4,816,236 Gardner, RECOVERY OF VANADIUM AND NICKEL FROM PETROLEUM RESIDUES, taught recovering vanadium from various Flexicoke residues with varying V contents and particle sizes. The patent reported that Flexicoke from the heater bed had 1–5 wt % vanadium pentoxide, while coke from the cyclone venturi fines had 8–12 wt % vanadium pentoxide. Coke from the wet scrubber had as much as 20 wt % vanadium pentoxide. The patentee taught mixing coke with NaOH, burning and then leaching to recover vanadium. A majority of the Ni was reported to be left in the solids after the leach step.

U.S. Pat. No. 5,259,864, Greenwalt, METHOD OF DISPOSING OF ENVIRONMENTALLY UNDESIRABLE MATERIAL AND PROVIDING FUEL FOR AN IRON MAKE PROCESS E.G., PETROLEUM COKE, taught using a sulfur and heavy metal containing petroleum coke in a melter. The coke was mostly burned to form a fluidized bed of coke which was then reacted with ore and oxygen to make molten iron or steel preproducts. A slag layer contained sulfur freed during combustion of the petroleum coke.

U.S. Pat. No. 5,277,795, Thornhill et al, PROCESS AND APPARATUS FOR RECOVERING HEAVY METAL FROM CARBONACEOUS MATERIAL, taught burning petroleum coke to produce ash then processing the ash to extract metallic compounds.

U.S. Pat. No. 5,324,341, Nagel et al, METHOD FOR CHEMICALLY REDUCING METALS IN WASTE COMPOSITIONS, taught molten metal processing of metal containing wastes. Multiple reducing agents reduced oxygen-containing metals compounds in a metal-containing waste composition. Claim 24 mentioned use of an oxide of V as an oxidizing agent.

U.S. Pat. No. 5,427,603, Samant et al, METHOD OF TREATING A VANADIUM-CONTAINING RESIDUE, taught processing petroleum coke with air at 850C. in a fluidized bed with an inert bed of granular iron oxide with an oxygen partial pressure between 10-4 bar and 10-6 bar to produce ash. The ash was then processed over a magnetic separator to recover the inert iron oxide for recycle.

U.S. Pat. No. 5,484,554 Vuoung et al, OXIDANT INJECTION FOR IMPROVED CONTROLLED OXIDATION, taught processing of coke in a partial oxidation reactor. The V in the coke forms a V rich slag in the reactor.

While not related directly to processing coke, U.S. Pat. No. 4,071,355, Staggers, RECOVERY OF VANADIUM FROM PIG IRON, taught removal of vanadium from pig iron to produce a vanadium rich slag by oxidizing molten pig iron at 2600–2900 F.

The teachings of these patents, which are incorporated by reference, could be summarized as follows.

Vanadium in petroleum containing coke is difficult to recover directly, that is, from the coke, because it is in a form which does not lend itself to conventional leaching approaches. The carbon, probably present in the form of condensed chelating structures, effectively shields significant portions of the metal from conventional leaching solutions.

Vanadium in coke can be recovered much more readily after combustion, because the vanadium in the ash produced is more susceptible to leaching, though even here some treatment, such as with sodium carbonate or sodium hydroxide was needed to improve metal recovery during leaching.

Vanadium in coke is always found with sulfur. The conventional way to deal with sulfur in steel making is to make slag with the sulfur.

We discovered that a molten metal process, originally developed to produce high purity hydrogen or synthesis gas from various waste streams, could be modified to process vanadium containing coke, dissolve the vanadium in its metallic state into the iron bath and reject much, but not all of the sulfur in the coke as H2S which could be processed in a Claus unit to recover elemental sulfur. We also discovered a way to enhance sulfur removal, by adding various agents which created a reducing atmosphere in the bath and promoted removal of dissolved sulfur as H2S. It was even possible to reduce or eliminate the need for sulfur capture agents and an accompanying sulfur rich slag, while processing V and S containing coke.

Details of the basics or a preferred molten metal process are disclosed in one or more of the following patents, which are incorporated by reference.

U.S. Pat. No. 5,755,839, MOLTEN METAL REACTOR SWING SYSTEM AND PROCESS.

U.S. Pat. No. 5,645,615, MOLTEN DECOMPOSITION APPARATUS AND PROCESS.

U.S. Pat. No. 5,577,346 MULTI-ZONE MOLTEN-METAL HYDROGEN AND FUEL GAS GENERATION PROCESS.

U.S. Pat. No. 5,435,814, MOLTEN METAL DECOMPOSITION APPARATUS.

The process defined by the above four patents could tolerate a great many feeds, including coal and trash, but was primarily directed to production of relatively pure hydrogen gas at superatmospheric pressure. This work was not directed toward vanadium recovery from petroleum coke, ignored the problem of S/V containing coke, and did not suggest use of reducing conditions in the bath during V capture, nor use of gaseous reducing agents to continuously, or at the end of a cycle, strip sulfur from the molten metal bath as H2S.

Our process used a special form of molten metal processing to dissolve the carbon, V and sulfur present in the coke. Much of the carbon is present in the form of a collapsed metalo-porphyrin surrounding an atom of vanadium metal. The carbon dissolves readily in the molten iron bath, exposing the vanadium and permitting rapid and complete dissolution of the vanadium and other metals found in the petroleum coke in the molten iron bath. Sulfur dissolves relatively rapidly in the molten metal bath, the important variable is to maintain relatively reducing conditions in the bath, e.g., by maintaining high carbon levels in the bed, to prevent oxidation of sulfur.

The process was fast and simple—no special processing of the coke was needed, though preferably it was dry. Heat/utility requirements were low, in fact the worse the feed in terms of % V in the coke, the more heat the process generated. The process was tolerant of many other impurities found in coke containing feed, such as Ni and S compounds.

BRIEF SUMMARY OF THE INVENTION

Accordingly, the present invention provides a process for dissolving coke containing both V and sulfur in a molten metal bath, preferably a molten iron bath to produce a molten metal bath containing dissolved carbon and dissolved vanadium metal and dissolved sulfur, exothermically oxidizing at least a majority of the net amount of carbon dissolved in said bath to produce carbon oxides and maintain said bath in a molten state and maintaining reducing conditions and a pre-determined amount of carbon in said bath sufficient to maintain at least a majority of said V and said sulfur dissolved in said molten metal bath in an elemental state, allowing said sulfur to accumulate in said bath and removing at least a portion of said dissolved sulfur as H2S which is removed as a product of the process.

Preferably, at least periodically there is added to said bath steam or hydrogen or a hydrocarbon in an amount sufficient to promote production of H2S from said bed, which produced H2S is removed as a product of the process.

Preferably, the bath is maintained in a relatively reducing mode of operation, so that little of the vanadium and/or sulfur is oxidized. The vanadium level is allowed to increase until the bath contains 5 wt % or 10 wt % V, more preferably at least 20 wt % V, and most preferably 40 wt % V. After sufficient Vanadium has accumulated, it may be beneficial to strip sulfur from the molten metal bath by addition of steam or methane or other hydrogen rich hydrocarbon, to desulfurize the bath. After the desired amount of sulfur has been removed from the bath, it is possible to conduct further processing of the dissolved elemental vanadium, as by addition of oxygen or other oxidizing agent, to promote oxidation of vanadium. This can be done by intermittently stopping addition of coke and/or increasing the addition of oxygen or oxygen containing gas until the desired amount of vanadium has been oxidized and removed from the molten iron bath as a slag product.

The bath may be continuously or intermittently replenished with fresh iron.

In preferred embodiments, the bath is run at superatmospheric pressure, preferably 2 to 200 atm. High pressure operation allows higher feedstock rates without excessive carryover of dust. Higher pressures also increases the rate at which carbon in feedstock dissolves in the molten metal bath.

Presence of large amounts of carbon in the bath (i.e., reducing conditions) permits processing of sulfur rich coke with much or essentially all of the sulfur content released as H2S, which can be readily processed in a refinery Claus unit or other H2S recovery process. If desired, especially at the end of a cycle when the last traces of sulfur must be removed, it is possible to operate with oxidizing conditions in the molten metal bath which will produce oxides of sulfur which may require sulfur capture with conventional slag forming agents or stack gas processing. Thus some slag can be formed, but only for a fraction of the cycle and the slag production will be only a fraction of that required by stoichiometry had the entire bath of coke been processed in a molten metal bath at relatively oxidizing conditions.

When desired, multiple zone processing of the coke, alone or admixed with a hydrocarbon, may be practiced to permit recovery of a relatively pure hydrogen stream.

Our process is generic as to the bath used. Circulating baths, pressurized single zone baths, multiple zone baths, and the like can all be used. Thus while a high pressure design, such as that developed by Ashland and disclosed in the above four patents discussed above which were assigned to Ashland, may be used it is also possible to use other molten metal bath designs such as the Molten Metal Technology reactor or other molten bath designs now existing or hereafter developed.

DETAILED DESCRIPTION OF PREFERRED EMBODIMENTS

Figure 1:
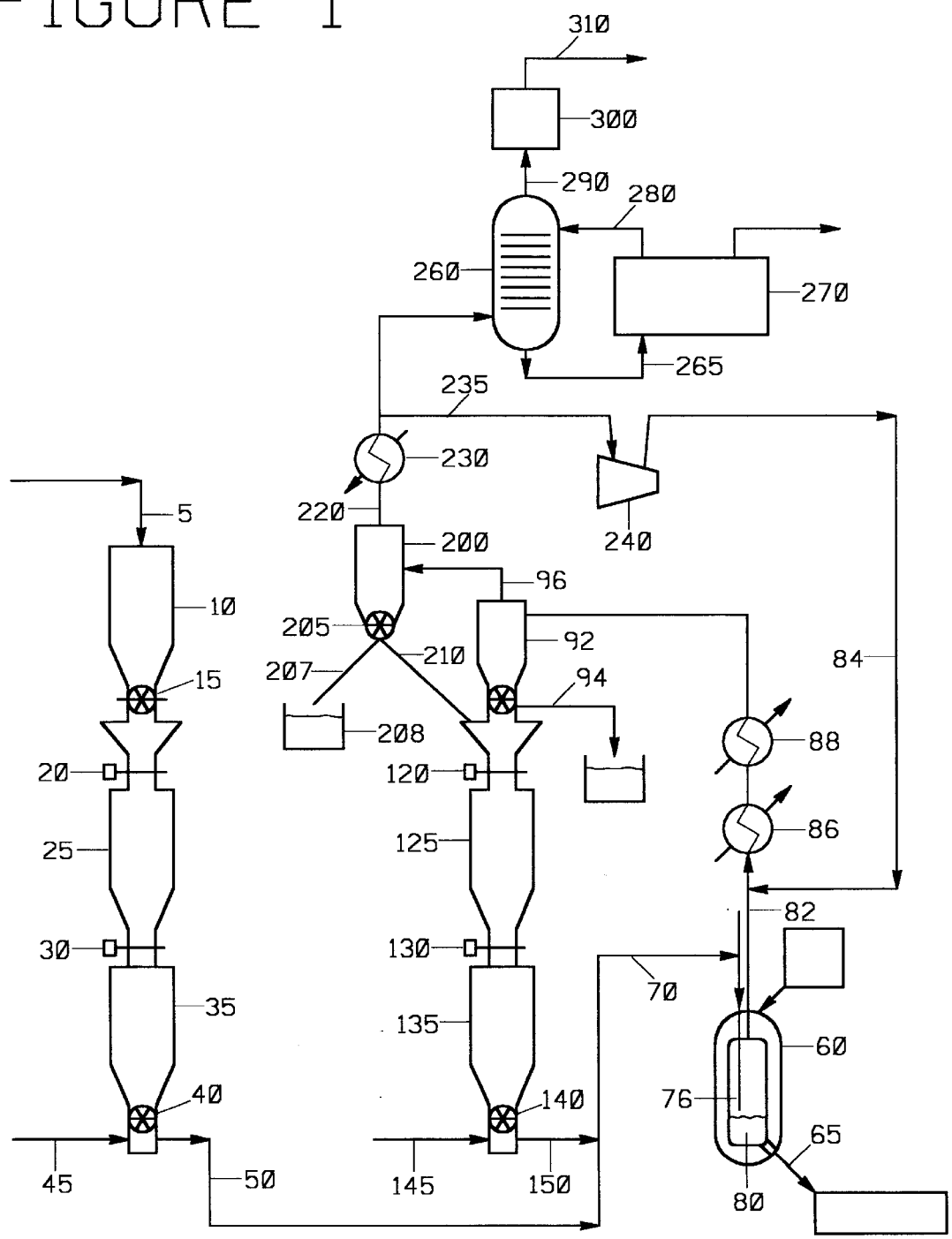
FIG. 1 is a simplified schematic drawing of a preferred embodiment wherein coke containing sulfur and V is processed in a molten metal reactor to produce a vanadium containing molten metal bath and H2S, with greatly reduced or eliminated slag formation due to sulfur.

The petroleum coke feedstock may be any metal containing coke. Usually the coke will contain vanadium, nickel, and sulfur. Such materials are well known and widely available, they are produced wherever coking is used as an upgrading step for heavy Venezuelan crudes.

The coke may be sponge coke from a delayed coker, shot coke, fines from fluid coker, and the like. Some fluidized coking units partially burn some of the coke, yielding a coke product of enhanced vanadium concentration but generally still classified as coke despite the oxidative treatment.

In addition to coke, the feed may also comprise, or consist essentially of, liquid hydrocarbons. Thus the process may be used to process Venezuelan or other crudes which are contaminated with vanadium, or liquid or semi-solid fractions derived from such crudes.

PROCESS DESCRIPTION

Referring to the FIGURE, a coke feed, typically a fine particulate feed having an average particle size less than 80 microns or even much smaller, is charged via line 5 to feed hopper 10. Coke is discharged via rotary valve 15 through open swing valve 20 into upper hopper 25. Coke is discharged down through swing valve 30 into pressurized hopper 35, from which it is continuously or intermittently discharged via rotary valve 40 into a flowing stream of steam from line 45. Other fluids may be used besides steam, but steam is preferred due to its ready availability and relative safety. The steam/coke mixture flows through line 50, is mixed with a preferred but optional recycle fines stream from line 150, and charged via line 70 into the HyMelt reactor 60. The coke/steam mixture is preferably discharged down via outlet 76 towards molten metal bath 80. Preferably the nozzle is close enough to the surface of metal bath 80 and is discharged with sufficient force to penetrate the metal bath.

Oxygen or oxygen containing gas is preferably co-fed with the coke. This allows a significant amount of preheating of the coke during its passage through the piping to nozzle outlet 76. A portion of the bed contents may be continuously or intermittently withdrawn via line 65 as a product of the process. Preferably essentially all of the vanadium in the coke accumulates in the bed in the form of elemental vanadium metal along with dissolved elemental sulfur.

Off gas, which usually will contain entrained droplets of iron/vanadium and/or perhaps some slag droplets is removed via line 82, quenched with relatively cool recycle gas from recycle gas line 84 and charged successively through heat exchanger 86 which produces high pressure steam and heat exchanger 88 which produces lower pressure ;steam. The temperature of the material withdrawn from reactor 60 is typically around 2800 F., while the temperature of the withdrawn vapor is reduced to 1000 F. and 350 F. respectively by passage through exchangers 86 and 88.

The reactor off gas and entrained solids are charged to cyclone 92 which recovers a low particulate vapor via vapor outlet line 96. A solids rich, dense phase fluidized phase is discharged via rotary valve 94, though the cyclone solids rich phase outlet may be sealed by other conventional means such as a flapper valve or immersion of the cyclone dipleg in a dense phase fluidized bed of particulates. The cyclone vapor phase is charged via line 96 to bag filter 200, which may be a conventional bag house or other gas/particulate separation means such as a third stage separator, electrostatic precipitator, or the like. A solids phase is continuously or intermittently removed via rotary valve 205 and charged via line 210 to admix with the cyclone 92 solids phase and pass via swing valve 120 into hopper 125 and swing valve 130 into recycle fines pressurized hopper 135. Pressurized fines are discharged via rotary valve 140 into flowing steam in line 145 to be recycled, with fresh fluidized coke feed, via line 70 to the HyMelt reactor.

A portion of the net addition of V to the molten metal bath may be withdrawn as either a coarse dust product from the cyclone separator via line 94 and collection means 98 or as a finer dust product from the bag house via line 207 and collection means 208.

The relatively particulate free vapor withdrawn via line 220 from bag filter means 200 may be further cooled using fin fan coolers, heat exchange with other process streams, or cooling water in cooler 230 to produce cooled vapor. A portion of cooled vapor is charged via line 235 to the inlet of recycle gas compressor 240 which discharges compressed recycle gas via line 84 to serve as quench stream. The remainder of the particulate free vapor is preferably charged through acid gas scrubber 260. Lean solvent in line 280 from solvent regenerator 270 is charged to an upper portion of the scrubber to contact acid gas. A relatively sweet gas stream is withdrawn via line 290 and charged via line 300 into ZnO treater 300 or equivalent clean up means to produce a purified gas stream which may be used as fuel or as a hydrogen rich syngas removed via line 310.

The rich solvent, with absorbed acid gas species, is removed via line 265 and recycled to solvent regenerator 270 which preferably recovers at least a portion of absorbed acidic sulfur containing gas species as H2S, which may be converted into elemental sulfur via a conventional Claus unit, not shown.

SULFUR CONTROL

The molten metal bath may be made sufficiently reducing by operating with large amounts of carbon that most and even essentially all of the sulfur in the coke will remain in the form of elemental sulfur dissolved in the molten metal bath. To further reduce the sulfur levels in the bath, as at the end of a cycle, it may be desirable to inject steam or methane into the molten metal bath to create reducing stripping gas which promotes release of sulfur form the bed as H2S. This may be done continuously or intermittently, and preferably is done after the molten metal bath has accumulated the desired amount of vanadium and it is important to desulfurize the bath.

The bath may be maintained significantly reducing by operating with at least 0.5 wt % carbon dissolved in the bath, and preferably contains more than 1 wt % carbon. Even higher carbon levels may be used with good results, such as 2, 3 or 4 wt % carbon.

The upper limit on carbon is usually set by solubility and sooting.

We claim:

1. A process for treating a coke containing vanadium and sulfur comprising the steps: dissolving coke containing both V and sulfur in a molten metal bath to produce a molten metal bath containing dissolved carbon, dissolved vanadium and dissolved elemental sulfur; adding to said bath an oxygen containing gas in an amount sufficient to oxidize the net carbon input to said bath and produce heat, but controlling the amount of carbon and oxygen in said bath to maintain reducing conditions in said bath; and at least periodically adding to said bath a reducing gas and removing at least a majority of said dissolved sulfur as hydrogen sulfide from said molten metal bath as a product of the process.

2. The process of claim 1 wherein the bath is allowed to accumulate at least 10 wt % dissolved V on an elemental metal basis and then a reducing gas is added to said bath to strip dissolved sulfur from said bath as H₂S.

3. The process of claim 2 wherein the bath contains at least 20 wt % V.

4. The process of claim 3 wherein the bath contains at least 40 wt % V.

5. The process of claim 1 wherein reducing conditions are maintained in said bath a majority of the time which are sufficient to maintain V as dissolved elemental metal and at least periodically oxidizing conditions are maintained in said bath which oxidize said dissolved sulfur to form oxidized sulfur species which float to the top of said bath and form a slag layer which is intermittently or continuously withdrawn as a product of the process.

6. The process of claim 1 wherein reducing conditions are maintained in said bath a majority of the time which are sufficient to maintain V as dissolved elemental metal and at least periodically oxidizing conditions are maintained in said bath which oxidize said dissolved sulfur and said dissolved vanadium to form oxidized species which float to the top of said bath and form a slag layer which is intermittently or continuously withdrawn as a product of the process.

7. The process of claim 6 wherein the oxidized vanadium species are periodically withdrawn by tapping a slag layer on top of the molten metal bath.

8. The process of claim 1 wherein V accumulation continues for at least 90% of the time and S desorption as H₂S occurs less than 10% of the time from the molten metal bath.

9. The process of claim 1 wherein dissolved sulfur is removed from said bath by injecting steam, normally gaseous hydrocarbon or a normally liquid hydrocarbon.

10. The process of claim 1 wherein said bath is a molten iron bath.

11. The process of claim 2 wherein the reducing gas is steam or methane.

* * * * *